United States Patent
Copeland et al.

(10) Patent No.: US 9,964,152 B2
(45) Date of Patent: May 8, 2018

(54) LUBRICATION FOR AN EXPENDABLE BEARING

(71) Applicants: Rolls-Royce Corporation, Indianapolis, IN (US); Rolls-Royce North American Technologies, Inc., Indianapolis, IN (US)

(72) Inventors: Andrew D. Copeland, Greenwood, IN (US); Craig M. Price, Mooresville, IN (US)

(73) Assignees: Rolls-Royce Corporation, Indianapolis, IN (US); Rolls-Royce North America Technologies, Inc., Indianapolis, IN (US)

( * ) Notice: Subject to any disclaimer, the term of this patent is extended or adjusted under 35 U.S.C. 154(b) by 59 days.

(21) Appl. No.: 15/158,076

(22) Filed: May 18, 2016

(65) Prior Publication Data

US 2016/0377121 A1 Dec. 29, 2016

Related U.S. Application Data

(60) Provisional application No. 62/185,876, filed on Jun. 29, 2015.

(51) Int. Cl.
*F16C 33/66* (2006.01)
*F16C 33/30* (2006.01)
(Continued)

(52) U.S. Cl.
CPC ........ *F16C 33/6696* (2013.01); *F16C 33/303* (2013.01); *F16C 33/62* (2013.01);
(Continued)

(58) Field of Classification Search
CPC .... F16C 33/6696; F16C 33/303; F16C 33/62; F16C 33/445
See application file for complete search history.

(56) References Cited

U.S. PATENT DOCUMENTS 3,001,838 A * 9/1961 Lamson .............. F16C 33/6696
29/898.1
4,508,396 A 4/1985 Doi et al.
(Continued)

FOREIGN PATENT DOCUMENTS

EP 3048162 A1 7/2016
JP 2011231785 A 11/2011
WO 2015041205 A1 3/2015

OTHER PUBLICATIONS

Response to European Search Report dated Dec. 15, 2016, from Counterpart European Application No. 16174262.2, filed Jun. 1, 2017, 7 pp.
(Continued)

*Primary Examiner* — Thomas R Hannon
(74) *Attorney, Agent, or Firm* — Shumaker & Sieffert, P.A.

(57) ABSTRACT

An expendable bearing and a method for making the same including an inner race defining an inner bearing diameter, an outer race defining an outer bearing diameter, a seal attached to the outer race and positioned adjacent and in contact with the inner race, where the inner race, the outer race, and the seal define a bearing cavity, a plurality of rolling elements positioned adjacent to the inner and outer races in the bearing cavity, a dry film lubricant on a surface of at least one of the inner race, the outer race, or the plurality of rolling elements, and a powder lubricant comprising carbon nanotubes disposed in the bearing cavity.

19 Claims, 3 Drawing Sheets

(51) Int. Cl.
*F16C 33/62* (2006.01)
*F16C 19/06* (2006.01)
*F16C 19/08* (2006.01)
*F16C 33/44* (2006.01)

(52) U.S. Cl.
CPC .............. *F16C 19/06* (2013.01); *F16C 19/08* (2013.01); *F16C 33/30* (2013.01); *F16C 33/44* (2013.01); *F16C 33/445* (2013.01); *F16C 2240/40* (2013.01); *F16C 2360/00* (2013.01)

(56) References Cited

U.S. PATENT DOCUMENTS

| | | |
|---|---|---|
| 5,163,757 A | 11/1992 | Graham |
| 5,284,394 A | 2/1994 | Lemelson |
| 5,351,786 A | 10/1994 | Graham et al. |
| 5,356,227 A | 10/1994 | Sibley et al. |
| 5,486,052 A | 1/1996 | Sibley et al. |
| 5,988,891 A | 11/1999 | Yamamoto et al. |
| 6,102,576 A * | 8/2000 | Toyota .................... F16C 33/32 384/492 |
| 6,702,473 B2 | 3/2004 | Kahlman et al. |
| 6,726,367 B2 | 4/2004 | Yamamoto et al. |
| 7,172,343 B2 | 2/2007 | Kinno et al. |
| 7,959,891 B2 | 6/2011 | Tenne et al. |
| 8,258,086 B2 | 9/2012 | Patel et al. |
| 2005/0213860 A1 | 9/2005 | Zhou |
| 2009/0033164 A1 | 2/2009 | Khan |
| 2009/0285512 A1 | 11/2009 | Gebert |
| 2011/0069917 A1 | 3/2011 | Yamada et al. |
| 2012/0134615 A1 | 5/2012 | Takasugi et al. |
| 2012/0184471 A1 | 7/2012 | Windrich et al. |
| 2012/0294557 A1 | 11/2012 | Soelch et al. |
| 2013/0004112 A1 | 1/2013 | Kawamura et al. |
| 2016/0238076 A1 * | 8/2016 | Aiga ....................... F16C 33/56 |

OTHER PUBLICATIONS

Miyoshi et al., "Solid Lubrication by Multiwalled Carbon Nanotubes in Air and in Vacuum for Space and Aeronautics Applications," Proceedings of World Tribology Congress III, Sep. 12-16, 2005, 2 pp.

Extended Search Report from counterpart European Application No. 16174262.2, dated Dec. 15, 2016, 9 pp.

* cited by examiner

LUBRICATION FOR AN EXPENDABLE BEARING

This application claims the benefit of U.S. Provisional Application No. 62/185,876 filed Jun. 29, 2015, which is incorporated herein by reference in its entirety.

TECHNICAL FIELD

The present disclosure generally relates to lubrication for a rolling element bearing having a limited life, such as a rolling element bearing for use in the engine of an aerial missile.

BACKGROUND

The present disclosure relates generally to rolling element bearings, which may be utilized in machines containing moving parts where it is desirable to maintain some type of relative motion between two components. Rolling element bearings typically include a plurality of rolling elements disposed in a bearing cavity between an inner race and an outer race, where the inner race may be attached to a rotor component of the machine and the outer race attached to a stationary component of the machine. As the rotor component moves, the plurality of rolling elements roll along the inner and outer races, thereby transferring the load forces and reducing the frictional forces that would otherwise occur between the rotor and stationary components.

SUMMARY

In some examples, the present disclosure describes an expendable bearing including an inner race defining an inner bearing diameter, an outer race defining an outer bearing diameter, a seal attached to the outer race and positioned adjacent and in contact with the inner race, where the inner race, the outer race, and the seal define a bearing cavity, a plurality of rolling elements positioned adjacent to the inner and outer races in the bearing cavity, a dry film lubricant on a surface of at least one of the inner race, the outer race, or the plurality of rolling elements, and a powder lubricant comprising carbon nanotubes disposed in the bearing cavity.

In another example, the disclosure describes device including a stationary component, a rotor shaft, where the rotor shaft rotates relative to the stationary component, and an expendable rolling element bearing including an inner race defining an inner bearing diameter connected to the rotor shaft, an outer race defining an outer bearing diameter connected to the stationary component, a seal attached to the outer race and positioned adjacent and in contact with the inner race, where the inner race, the outer race, and the seal define a bearing cavity, a plurality of rolling elements positioned adjacent to the inner and outer races in the bearing cavity, a dry film lubricant on a surface of at least one of the inner race, the outer race, or the plurality of rolling elements, and a powder lubricant comprising carbon nano-tubes disposed in the bearing cavity.

In another example, the disclosure describes method including aligning a plurality of rolling elements along an inner radius of an outer race, aligning the plurality of rolling elements along an outer radius of an inner race, where the inner race is rotatable relative to the outer race, depositing a dry film lubricant on a surface of at least one of the inner race, the outer race, or the plurality of rolling elements, depositing a powder lubricant comprising carbon nanotubes in a space between the inner and outer races, and attaching a seal to the outer race, where the seal is positioned adjacent to and in contact with the inner race, where the inner race, the outer race, and the seal define a bearing cavity that encloses the plurality of rolling elements.

The details of one or more examples are set forth in the accompanying drawings and the accompanying description below. Other features, objects, and advantages will be apparent from the description and drawings, and from the claims.

DETAILED DESCRIPTION

Figure 1:
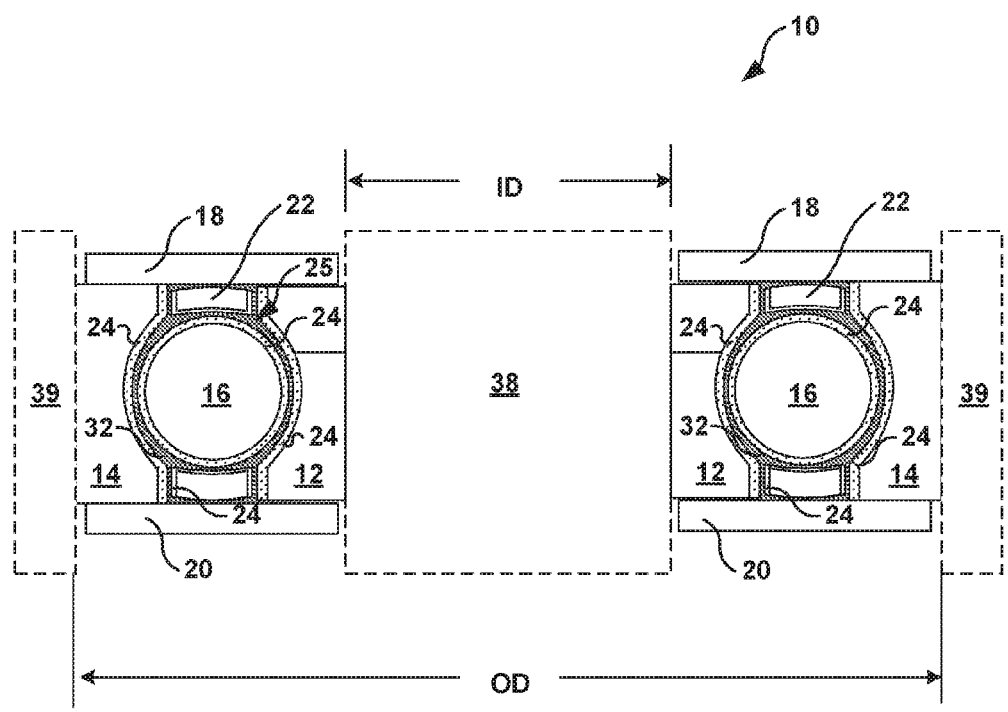
FIG. 1 is a conceptual cross-sectional view illustrating an example rolling element bearing.

The disclosure generally describes a lubricated rolling element bearing (e.g., roller bearings and thrust bearings) intended for use in limited-life or one-time-use applications that are exposed to extreme temperature, including, for example, for use in an aerial missile. Rolling element bearings are useful to transfer loads between two machine components while allowing the two components, e.g. a rotor component and a stationary component, to move relative to each other in a desired direction. In accordance with examples described herein, the present disclosure provides a way to make a lubricated rolling element bearing using at least one dry film lubricant and carbon nano-tubes to produce a rolling element bearing that may be operated in extreme environments above about 600° C. (e.g., up to 900° C.) for a limited, predetermined duration without failing. In some examples, the rolling element bearing may be operated with passing air as the primary means for regulating heat generated by the rolling element bearing (e.g., without the use of grease or oil as a lubricant).

In some examples, rolling element bearings need some amount of lubrication to prevent the bearing from failing during operation. Rolling element bearings that lack lubrication, contain insufficient lubrication, or contain the wrong type of lubrication may experience premature fatigue and failure. For example, an improperly lubricated rolling element bearing may undergo pressure-induced welding, in which load forces on the rolling element bearing press the rolling elements into the inner or outer races. The combination of the resulting high pressure, friction forces/high heat, and direct contact between two pieces of metal create microscopic spot welds between respective races and rolling elements. As the rolling elements continue to roll, the spot welds are torn loose, establishing imperfections in the rolling element bearing that may lead to additional deleterious effects. In some examples, grease or oil may be used to lubricate the rolling elements and reduce frictional forces and wear on the rolling element bearing. Grease however, may be used in low temperature environments, e.g., below 400° C. Operating the rolling element bearing in environments above such temperatures may cause the grease to burn or otherwise degrade, resulting in loss of lubrication and in some cases accelerating the deterioration of the rolling element bearing. The present disclosure provides a way to lubricate a rolling element bearing using at least one dry film lubricant and carbon nano-tubes to maintain sufficient lubrication for a predetermined duration (e.g., aerial flight time of a missile) even while operating the rolling element bearing in high temperature environments (e.g., above about 600° C.).

In some examples, oil may be used as a lubricant for the rolling element bearing, wherein the oil also acts as a heat sink for the bearing. Oil lubrication may be a poor lubricant where moisture (e.g., water vapor as product from a combustion chamber) may be introduced into the bearing cavity of the rolling element bearing due to the incompressibility of water relative to oil. Additionally, oil lubrication may require the device containing the rolling element bearing to be outfitted with additional components such as an oil-cooler. In some examples, incorporating additional components on the device may not be a viable option, particularly where size, weight, and/or cost of the device are critical factors, for example, as in an aerial device, e.g., a missile engine, having limited-life or one-time-use applications. The present disclosure provides a rolling element bearing for operating within a combustion engine (e.g., missile engine) under high temperatures (e.g., above about 600° C.) using passing air as a heat sink rather than an additional component such as an oil-cooler.

FIG. 1 shows a conceptual cross-sectional view illustrating an example rolling element bearing 10 including an inner race 12, an outer race 14, and rolling elements 16 disposed in a bearing cavity 25 between inner and outer races 12 and 14. The rolling element bearing 10 may be installed in a device, e.g. an engine of an aerial missile, so that inner race 12 may be attached to a rotor component 38 and outer race 14 may be attached to a stationary component 39 relative to rotor component 38. As rotor component 38 and inner race 12 rotate, the roller components 16 begin to roll across the inner race 12 and outer race 14 in opposite directions with minimal resistance in comparison to the otherwise direct contact between rotor component 38 and stationary component 39.

In some examples, inner and outer races 12 and 14 may contain grooves along the contact surfaces between the respective races and the rolling elements 16. The grooves along the contact surfaces of the inner and outer races 12 and 14 may help retain and align rolling elements 16 within the bearing cavity 25 during operation of rolling element bearing 10. In some examples, inner and outer races 12 and 14 may be formed from one or more parts respectively to assist in the assembly of rolling element bearing 10. For example, inner race 12 of FIG. 1 is formed from two parts. The two parts may, in some examples be fused together after rolling elements 16 and cage 22 are disposed in bearing cavity 25, thereby preventing rolling elements 16 from readily being removed from bearing cavity 25.

Inner and outer races 12 and 14 may be formed from the same or different materials. In some examples inner and outer races 12 and 14 may be formed from materials that can withstand high temperatures, such as the temperature of an engine, without deforming or otherwise degrading. Such materials may include, for example, high temperature steel (e.g., T-900 Steel, M50 Steel, or the like), high temperature ceramics, (e.g., silicon nitride (SiN)), or the like.

In some examples, rolling elements 16 may be in the form of ball bearing as depicted in FIG. 1, however, other configurations are also contemplate including, for example spherical, cylindrical, tapered, geared, needled, or the like. In some examples, rolling elements 16 may form one or more rows within bearing cavity 25 (e.g., a double-rowed rolling element bearing).

Rolling elements 16 may be formed from any materials that can withstand high temperatures and the load forces exerted from the rotor and stationary components 38 and 39. Such materials may include, for example, high temperature ceramics (e.g. silicon nitride (SiN)), high temperature steel (e.g., T-900 Steel, M50 Steel, or the like), or the like.

In some examples, rolling element bearing 10 may also include a cage 22 disposed around rolling elements 16 to separate and substantially maintain (e.g., maintain or nearly maintain) a distance between adjacent rolling elements 16 about a predetermined distance. In some examples, cage 22 may maintain rolling elements 16 substantially equidistant from one another during operation of rolling element bearing 10. In some examples, cage 22 may be formed of two parts that joined together in the adjacent space between each of the rolling elements 16. Cage 16 may be formed of materials capable of withstanding high temperatures including, for example, carbon-carbon composites, high temperature steel, or the like. In some examples, cage 22 may be coated with one or more layers of a dry film lubricant.

In some examples, at least some (e.g., all) of the various components of rolling element bearing 10 may be coated with a dry film lubricant (hereinafter "DFL 24"). For example as shown in FIG. 1, DFL 24 may be on the various contact surfaces between rolling elements 16, inner race 12, outer race 14, and cage 22. DFL 24 may be applied using a variety of techniques. For example, DFL 24 may be applied to the respective components of rolling element bearing 10 using a powder coatings process, where DFL 24 is applied electrostatically and subsequently cured on the surface of the respective components of rolling element bearing 10. In other examples, DFL 24 may be applied to the respective components using an aerosol spray and subsequently cured prior to assembly, or the like.

In some examples DFL 24 may include at least one organic or inorganic dry lubricant including, for example, graphite, molybdenum disulfide, tungsten disulfide, polytetrafluoroethylene, or the like. An example of a DFL 24 that may be applied to the various components of rolling element bearing 10 may include vitreous graphite solid film lubricant (e.g., Lube-Lok® 1000 manufactured by Everlube Products). In some examples, the composition of DFL 24 may maintain lubrication for rolling element bearing 10 at higher temperatures than what could otherwise be obtained using grease or oil-based lubricants.

While the rolling element bearing 10 shown in FIG. 1 shows DFL 24 on all contacting surfaces between rolling elements 16, inner race 12, outer race 14, and cage 22, in some examples, DFL 24 may be on more or fewer components of rolling element bearing 10. In some examples, only a single layer of DFL 24 may be present between adjacent contacting surfaces. For example, DFL 24 may be on rolling elements 16 but not inner and outer races 12 and 14. As another example, DFL 24 may be on inner and outer races 12 and 14 but not rolling elements 16. In some examples, DFL 24 on the various components of rolling element bearing 10 may be the same or different compositions. For example, rolling elements 16 may be coated with a first type of DFL 24 while inner and outer races 12 and 14 are coated with a different type of DFL 24.

Figure 2:
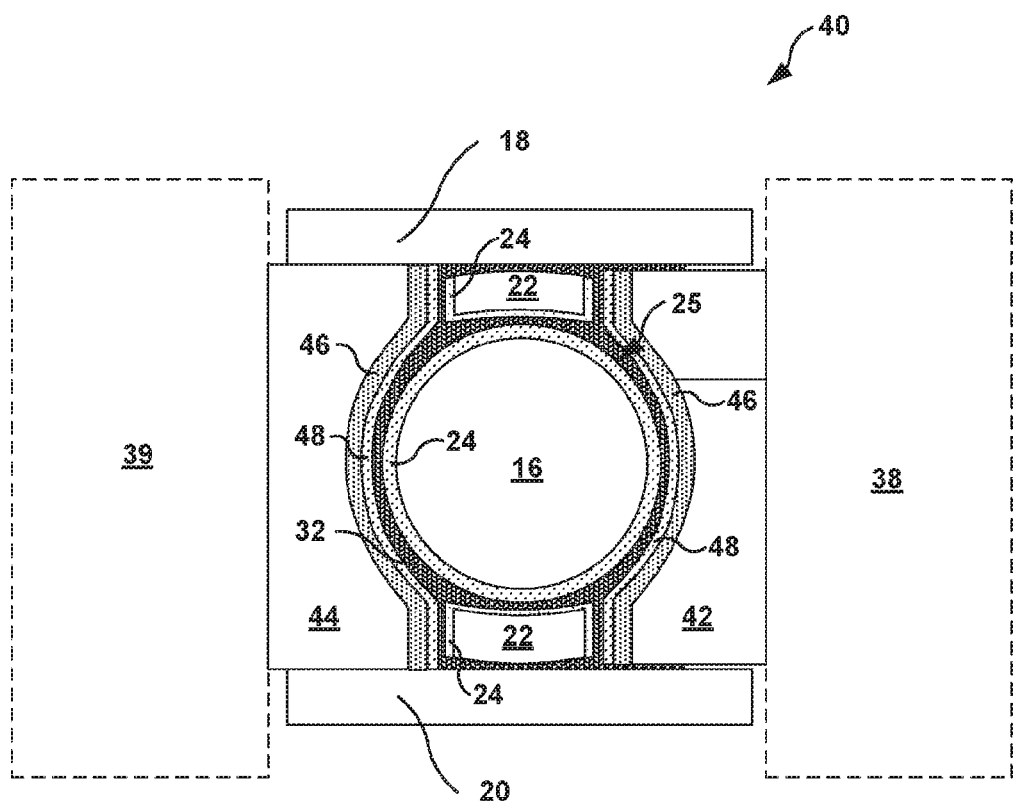
FIG. 2 is a conceptual cross-sectional view illustrating an example rolling element bearing.

In some examples, DFL 24 may include more than one layer. For example, as illustrated in FIG. 2, example rolling element bearing 40 includes an inner race 42 and outer race 44 including a first DFL coating 46 and a second DFL coating 48 on DFL 46. In some examples, first and second DFL coatings 46 and 48 may be different compositions including, for example, first DFL coating 46 made of an inorganic ceramic lubricant and second DFL coating 48 made of a graphitic lubricant. Such combinations of first DFL coating 46 and a second DFL coating 48 may produce beneficial effects for rolling element bearing 40 including, for example, increasing the temperature range for which rolling element bearing 40 may be operated without deteriorating.

In some examples, rolling element bearing 10 may also include carbon nanotubes (hereinafter "CNTs 32") deposited in particulate (e.g., power) form in bearing cavity 25. CNTs 32 may have desirable mechanical and thermal properties, able to withstand elevated temperatures without deteriorating. In some examples, the structure of CNTs 32 may be able to reduce the fictional forces between rolling elements 16 and inner and outer races 12 and 14, thereby helping to prevent rolling element bearing 10 from overheating. In some examples, CNTs 32 may include graphite having nano-scale dimensions, for example, CNTs 32 may be in the form of a tube having a diameter about 0.5-50 nm and a length ranging from a about 100 nm to a few microns. In some examples, CNTs 32 may be single-walled or multi-walled (e.g., double or triple-walled) structures.

In some examples, the combination of CNTs 32 in bearing cavity 25 and one or more layers of DFL 24 on components of rolling element bearing 10 may help to further reduce the frictional forces between rolling elements 16 and other components of rolling element bearing 10. In some examples, CNTs 32 and DFL 24 may allow rolling element bearing 10 to operate for a predetermined duration without significant degradation and without utilizing oil cooling or fuel cooling. In some examples, air cooling may be sufficient to prevent rolling element bearing 10 from deteriorating during operation.

Rolling element bearing 10 may also include upper and lower shields 18 and 20. Upper and lower shields 18 and 20 may help seal bearing cavity 25, thereby helping to retain CNTs 32 within bearing cavity 25 while helping to reduce or substantially prevent (e.g., prevent or nearly prevent) other contaminates or debris from being introduced into bearing cavity 25 that may otherwise act as an abrasive causing physical damage to the components of rolling element bearing 10. In some examples, upper and lower shields 18 and 20 may be attached to one of the respective races, e.g., outer race 44, allowing the other respective race, e.g., inner race 42, to move freely relative to upper and lower shield 18 and 20. Upper and lower shield 18 and 20 may, in some examples, be made from any materials that can withstand high temperatures including, for example, high temperature steel (e.g., T-900 steel, M50 steel, 347 steel, or the like), high temperature metal alloys (e.g., austenite nickel chromium alloy), high temperature ceramics, or the like.

Figure 3:
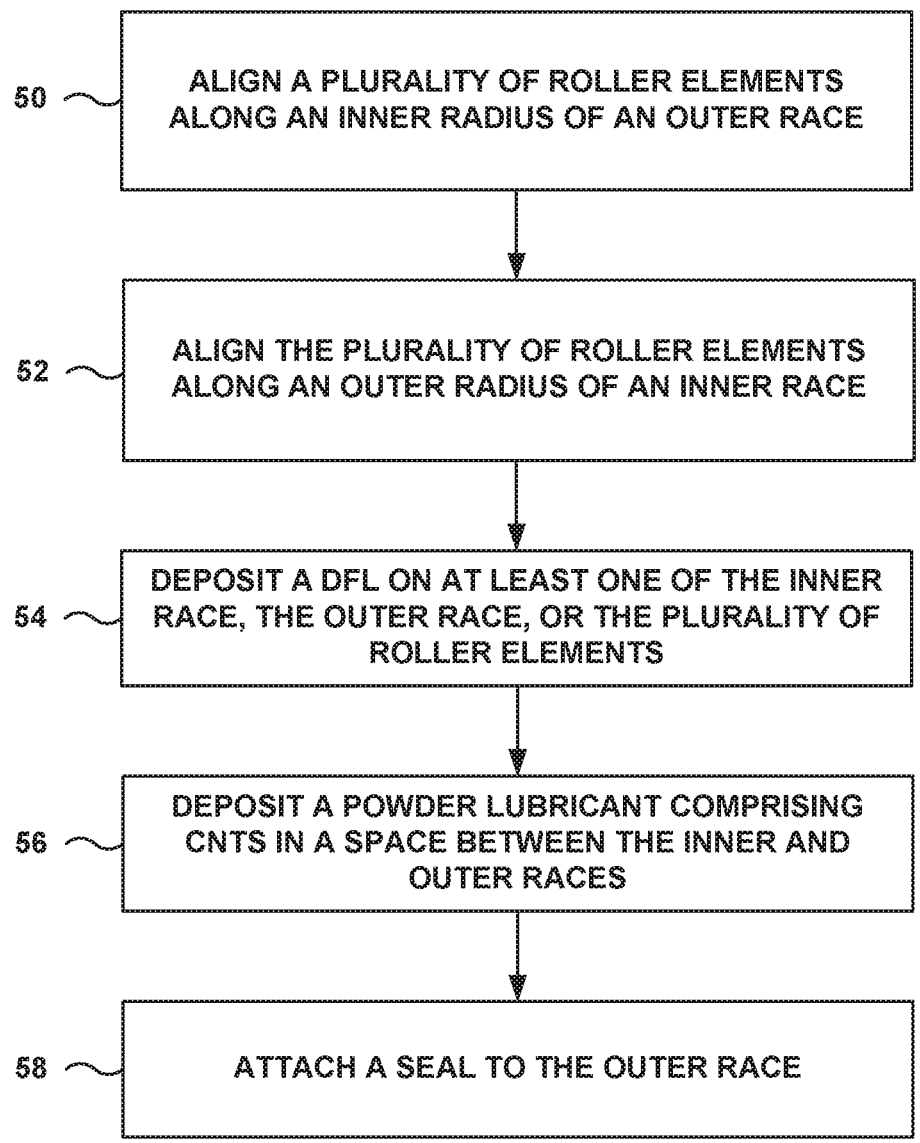
FIG. 3 is a flow diagram illustrating an example technique for forming rolling element bearing.

FIG. 3 is a flow diagram illustrating an example technique for forming a rolling element bearing as described by the disclosure. FIG. 3 is described below in reference to FIG. 1 for illustrative purposes, however, such descriptions are not intended to be limiting and the techniques of FIG. 3 may be used to form other bearings or the bearings of FIGS. 1-2 may be formed using other techniques.

FIG. 3 illustrates an example technique that includes substantially aligning (e.g., aligning or nearly aligning) a plurality of rolling elements 16 along an inner radius of an outer race 14 (50) and substantially aligning (e.g., aligning or nearly aligning) the plurality of rolling elements 16 along an outer radius of an inner race 12 (52), where inner race 12 is rotatable relative to outer race 14. As described above, inner and outer races 12 and 14 and rolling elements 16 may be formed using high temperature materials as described above capable of withstanding operating temperatures above 600° C. In some examples the plurality of rolling elements 16 may be deposited in a cage 22 as described above, where the cage separates and substantially maintains a distance between adjacent rolling elements 16 about a predetermined distance, such as substantially equidistant from one another.

The technique of FIG. 3 also may include depositing one or more DFL 24 coatings on a surface of at least one of inner race 12, outer race 14, or plurality of rolling elements 16 (54) using the techniques described above, such as spraying or powder coating. In some examples the inner race 12, outer race 14, or the plurality of rolling elements 16 all may contain DFL 24 on the contact surfaces between the components. In some examples, DFL 24 may also be deposited on a surface of cage 22.

In some examples, the technique of FIG. 3 may include depositing CNTs 32 between the inner race 12 and outer race 14 (56). In some examples, CNTs 32 may substantially fill (e.g., fill or nearly fill) bearing cavity 25 when rolling element bearing 10 is fully assembled. CNTs 32 may include, consist essentially of, or consist of carbon nanotubes that assist in reducing frictional forces of rolling element bearing 10 (e.g., between rolling elements 16 and inner race 12, rolling elements 16 and outer race 14, or both).

In some examples, the technique of FIG. 3 may include attaching at least one seal (e.g., upper seal 18 and lower seal 20) to outer race 14 (58), which may enclose rolling elements 16 and CNTs 32 in bearing cavity 25 and help protect rolling element bearing 10 from the intrusion of outside contaminates. In some examples, the at least one seal (e.g., upper seal 18 and lower seal 20) may be positioned adjacent to and in contact with inner race 12 so inner race 12 may continue to rotate relative to outer race 14 and the seal.

Various examples have been described. These and other examples are within the scope of the following claims.

What is claimed is:

1. An expendable bearing comprising:
   an inner race defining an inner bearing diameter;
   an outer race defining an outer bearing diameter, wherein the inner race and the outer race define a bearing cavity;
   a plurality of rolling elements positioned adjacent to the inner and outer races in the bearing cavity;
   a dry film lubricant on a surface of at least one of the inner race, the outer race, or the plurality of rolling elements; and
   a powder lubricant consisting essentially of carbon nanotubes disposed in the bearing cavity.

2. The expendable bearing of claim 1, wherein the carbon nanotubes comprise graphite having nano-scale dimensions.

3. The expendable bearing of claim 1, further comprising a first seal attached to the outer race and positioned adjacent and in contact with the inner race and a second seal attached to the outer race and positioned adjacent and in contact with the inner race, wherein the first seal and the second seal are positioned on opposite sides of the inner and outer races such that the first seal, the second seal, the inner race, and the outer race define the bearing cavity.

4. The expendable bearing of claim 1, wherein the inner race and the outer race comprise a high temperature steel with a maximum use temperature rating of at least 600 degrees Celsius.

5. The expendable bearing of claim 4, wherein the high temperature steel has a maximum use temperature rating of at least 900 degrees Celsius.

6. The expendable bearing of claim 1, wherein at least one roller element of the plurality of rolling elements comprises a ceramic material.

7. The expendable bearing of claim 1, further comprising a cage positioned in the bearing cavity that separates and substantially maintains a distance between adjacent rolling elements of the plurality of rolling elements about a predetermined distance.

8. The expendable bearing of claim 7, further comprising a dry film lubricant deposited on a surface of the cage.

9. A device comprising:
   a stationary component;
   a rotor shaft, wherein the rotor shaft rotates relative to the stationary component; and
   an expendable rolling element bearing comprising:
      an inner race defining an inner bearing diameter connected to the rotor shaft;
      an outer race defining an outer bearing diameter connected to the stationary component, wherein the inner race and the outer race define a bearing cavity;
      a plurality of rolling elements positioned adjacent to the inner and outer races in the bearing cavity;
      a dry film lubricant on a surface of at least one of the inner race, the outer race, or the plurality of rolling elements; and
      a powder lubricant consisting essentially of carbon nanotubes disposed in the bearing cavity.

10. The device of claim 9, wherein the expendable rolling element bearing further comprising a cage positioned in the bearing cavity that separates and substantially maintains a distance between adjacent rolling elements of the plurality of rolling elements about a predetermined distance.

11. The device of claim 9, wherein the device has a one-time-use application.

12. The device of claim 11, wherein the device is installed in an engine for an aerial missile.

13. The device of claim 9, further comprising a first seal attached to the outer race and positioned adjacent and in contact with the inner race and a second seal attached to the outer race and positioned adjacent and in contact with the inner race, wherein the first seal and the second seal are positioned on opposite sides of the inner and outer races such that the first seal, the second seal, the inner race, and the outer race define the bearing cavity.

14. A method comprising:
   aligning a plurality of rolling elements along an inner radius of an outer race;
   aligning the plurality of rolling elements along an outer radius of an inner race, wherein the inner race is rotatable relative to the outer race;
   depositing a dry film lubricant on a surface of at least one of the inner race, the outer race, or the plurality of rolling elements; and
   depositing a powder lubricant consisting essentially of carbon nanotubes in a space between the inner and outer races.

15. The method of claim 14, further comprising attaching a seal to the outer race, wherein the seal is positioned adjacent to and in contact with the inner race, wherein the inner race, the outer race, and the seal define a bearing cavity that contains the plurality of rolling elements.

16. The method of claim 14, further comprising depositing the plurality of roller element in a cage, wherein the cage separates and substantially maintains a distance between adjacent rolling elements of the plurality of rolling elements about a predetermined distance.

17. The method of claim 16, further comprising depositing a dry film lubricant on a surface of the cage.

18. The method of claim 14, wherein the inner race and the outer race comprise a high temperature steel with a maximum use temperature rating above 600 degrees Celsius.

19. The method of claim 14, further comprising installing the bearing in a single-use-device.

* * * * *